United States Patent
McEroy Flavelle et al.

(10) Patent No.: US 11,393,162 B1
(45) Date of Patent: *Jul. 19, 2022

(54) SYSTEM AND METHOD FOR CREATING, MANAGING, AND DISPLAYING 3D DIGITAL COLLECTIBLES

(71) Applicant: Dapper Labs Inc., Vancouver (CA)

(72) Inventors: Donald Dundas McEroy Flavelle, Abbotsford (CA); Catherine Marzi Tedman, Vancouver (CA); Courtney McNeil, Vancouver (CA); Denise Cascelli Schwenck Bismarque, Vancouver (CA); Christopher Patrick Scott, Vancouver (CA); Alan Carr, Las Vegas, NV (US); Eric Yu-Yin Lin, Surrey (CA)

(73) Assignee: Dapper Labs, Inc., Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/529,383

(22) Filed: Nov. 18, 2021

Related U.S. Application Data

(63) Continuation of application No. 17/229,455, filed on Apr. 13, 2021, now Pat. No. 11,210,844.

(51) Int. Cl.
| | |
|---|---|
| *G06T 15/20* | (2011.01) |
| *G06F 16/71* | (2019.01) |
| *G06F 16/783* | (2019.01) |
| *G06T 19/20* | (2011.01) |
| *G06F 16/738* | (2019.01) |
| *G06F 16/78* | (2019.01) |

(52) U.S. Cl.
CPC .............. *G06T 15/20* (2013.01); *G06F 16/71* (2019.01); *G06F 16/739* (2019.01); *G06F 16/783* (2019.01); *G06F 16/7867* (2019.01); *G06T 19/20* (2013.01); *G06T 2219/2016* (2013.01)

(58) Field of Classification Search
None
See application file for complete search history.

(56) References Cited

U.S. PATENT DOCUMENTS

| | | |
|---|---|---|
| 3,467,382 A | 9/1969 | Leadley |
| 5,515,486 A | 5/1996 | Amro |
| (Continued) | | |

OTHER PUBLICATIONS

Febrero Dapper Labs founder discusses CryptoKitties and digital collectible, downloaded @ https://coinrivet.com/it/dapper-labs-founder-discusses-cryptokitties-and-digital-collectibles/, posted online on Nov. 18, 2019 (Year: 2019).*

(Continued)

*Primary Examiner* — Yingchun He
(74) *Attorney, Agent, or Firm* — Schwegman Lundberg & Woessner, P.A.

(57) ABSTRACT

A system and method for creating, managing, and displaying 3D digital collectibles comprising a virtual, three dimensional, n-sided structure including a digital media file or set of digital media files representing an event rendered on a representation of at least a first surface thereof, and data relating to the event rendered on at least a second surface thereof and other content on one or more other surfaces, where the digital media file may be video clip of the event that can be played automatically via a media player associated with the display.

25 Claims, 15 Drawing Sheets

(56) References Cited

U.S. PATENT DOCUMENTS

| | | |
|---|---|---|
| 5,678,015 A | 10/1997 | Goh |
| 5,808,663 A | 9/1998 | Okaya |
| 5,898,435 A | 4/1999 | Nagahara |
| 6,094,237 A | 7/2000 | Hashimoto |
| 6,774,914 B1 | 8/2004 | Benayoun |
| D576,635 S | 9/2008 | Nathan |
| 7,730,059 B2 | 6/2010 | Behnen |
| D623,657 S | 9/2010 | Fitzmaurice |
| 7,957,061 B1 | 6/2011 | Connor |
| 8,510,680 B2 | 8/2013 | Kang |
| D690,310 S | 9/2013 | Brinda |
| 8,613,018 B2 | 12/2013 | Kim |
| 8,681,105 B2 | 3/2014 | Huh |
| D712,910 S | 9/2014 | Liao |
| 8,836,863 B2 | 9/2014 | Hwang |
| 8,943,541 B2 | 1/2015 | Marlow |
| 9,152,695 B2 | 10/2015 | Tibrewal |
| 9,304,655 B2 | 4/2016 | Sinha |
| 9,360,991 B2 | 6/2016 | Celebisoy |
| 9,626,724 B2 | 4/2017 | Tatham |
| 9,684,915 B1 | 6/2017 | Cronin |
| 9,762,757 B2 | 9/2017 | Kim |
| 9,766,722 B2 | 9/2017 | Park |
| 9,911,395 B1 | 3/2018 | Townsend |
| 10,007,393 B2 | 6/2018 | King |
| D829,228 S | 9/2018 | Wo |
| D845,340 S | 4/2019 | Wu |
| 10,289,972 B1 | 5/2019 | Goyal |
| 10,474,242 B2 | 11/2019 | Yin |
| 10,576,379 B1 | 3/2020 | Wakeford |
| 10,625,163 B1 | 4/2020 | Hsu |
| D888,761 S | 6/2020 | Pazmino |
| 10,712,898 B2 | 7/2020 | Christmas |
| 10,712,923 B1 | 7/2020 | Pathmanathan |
| D910,067 S | 2/2021 | Kim |
| D916,902 S | 4/2021 | Pazmino |
| 10,983,680 B2 | 4/2021 | Kuribayashi |
| 10,984,606 B1 | 4/2021 | Dalmia |
| 11,037,410 B2 | 6/2021 | Pilnock |
| 11,099,709 B1 | 8/2021 | McNeil |
| 2002/0069415 A1 | 6/2002 | Humbard |
| 2002/0184260 A1 | 12/2002 | Martin |
| 2003/0134563 A1 | 7/2003 | Gray |
| 2003/0142136 A1 | 7/2003 | Carter |
| 2005/0289590 A1 | 12/2005 | Cheok |
| 2007/0186186 A1 | 8/2007 | Both |
| 2007/0241016 A1 | 10/2007 | Piczon |
| 2009/0256780 A1 | 10/2009 | Small |
| 2009/0299891 A1 | 12/2009 | Sapir |
| 2010/0058248 A1 | 3/2010 | Park |
| 2010/0169836 A1 | 7/2010 | Stallings |
| 2010/0309228 A1 | 12/2010 | Mattos |
| 2011/0022988 A1 | 1/2011 | Lee |
| 2011/0096006 A1 | 4/2011 | Jeong |
| 2011/0261171 A1 | 10/2011 | Otsuka |
| 2011/0307834 A1 | 12/2011 | Wu |
| 2011/0310100 A1 | 12/2011 | Adimatyam |
| 2011/0316972 A1 | 12/2011 | Demas |
| 2012/0032958 A1 | 2/2012 | Werline |
| 2012/0038754 A1 | 2/2012 | Na |
| 2012/0090005 A1 | 4/2012 | Marlow |
| 2012/0115606 A1 | 5/2012 | Seelig |
| 2012/0179672 A1 | 7/2012 | Van Wie |
| 2012/0200495 A1 | 8/2012 | Johansson |
| 2012/0313933 A1 | 12/2012 | Tsukagoshi |
| 2013/0174035 A1 | 7/2013 | Grab |
| 2013/0182072 A1 | 7/2013 | Seo |
| 2013/0263059 A1 | 10/2013 | Antonio |
| 2013/0346911 A1 | 12/2013 | Sripada |
| 2014/0028674 A1 | 1/2014 | Eldin |
| 2014/0033078 A1 | 1/2014 | Goldman |
| 2014/0137020 A1 | 5/2014 | Sharma |
| 2014/0258938 A1 | 9/2014 | Christmas |
| 2014/0337321 A1 | 11/2014 | Coyote |
| 2014/0337792 A1 | 11/2014 | Phang |
| 2014/0337915 A1 | 11/2014 | Kanee |
| 2015/0011298 A1 | 1/2015 | Haid |
| 2015/0019986 A1 | 1/2015 | White |
| 2015/0067603 A1 | 3/2015 | Tanaka |
| 2015/0160824 A1 | 6/2015 | White |
| 2015/0245014 A1 | 8/2015 | Guo |
| 2015/0268831 A1 | 9/2015 | Sripada |
| 2015/0324886 A1 | 11/2015 | Hurst |
| 2016/0179314 A9 | 6/2016 | Ku |
| 2016/0180449 A1 | 6/2016 | Naware |
| 2017/0003851 A1 | 1/2017 | Moore |
| 2017/0046042 A1 | 2/2017 | Gotcher |
| 2017/0078654 A1 | 3/2017 | Facin |
| 2017/0151484 A1 | 6/2017 | Reilly |
| 2017/0178236 A1 | 6/2017 | Saigh |
| 2018/0061363 A1 | 3/2018 | Lee |
| 2018/0188831 A1 | 7/2018 | Lyons |
| 2018/0190003 A1 | 7/2018 | Upadhyay |
| 2018/0213950 A1 | 8/2018 | Millman |
| 2018/0220102 A1 | 8/2018 | Pino |
| 2018/0276632 A1 | 9/2018 | Gandevia |
| 2019/0073705 A1 | 3/2019 | Brown |
| 2019/0113358 A1 | 4/2019 | Moriyasu |
| 2019/0132575 A1 | 5/2019 | Izumi |
| 2019/0139296 A1 | 5/2019 | Lakshman |
| 2019/0199995 A1 | 6/2019 | Yip |
| 2019/0304160 A1 | 10/2019 | Izumi |
| 2019/0379876 A1 | 12/2019 | Hur |
| 2020/0005284 A1 | 1/2020 | Vijayan |
| 2020/0020024 A1 | 1/2020 | Lyons |
| 2020/0021668 A1 | 1/2020 | Lyons |
| 2020/0037943 A1 | 2/2020 | Chaja |
| 2020/0050855 A1 | 2/2020 | Jabara |
| 2020/0066047 A1 | 2/2020 | Karalis |
| 2020/0090303 A1 | 3/2020 | Zhang |
| 2020/0092406 A1 | 3/2020 | Diamond |
| 2020/0098279 A1 | 3/2020 | Al-Khalifa |
| 2020/0142579 A1 | 5/2020 | Shigeta |
| 2020/0159394 A1 | 5/2020 | Chassen |
| 2020/0179759 A1 | 6/2020 | Kubota |
| 2020/0184547 A1 | 6/2020 | Andon |
| 2020/0279438 A1 | 9/2020 | Ohashi |
| 2020/0329266 A1 | 10/2020 | Takaku |
| 2020/0353362 A1 | 11/2020 | Sachson |
| 2021/0001231 A1 | 1/2021 | Kurabayashi |
| 2021/0035415 A1 | 2/2021 | Pilnock |
| 2021/0120982 A1 | 4/2021 | Spiro |
| 2021/0192651 A1 | 6/2021 | Groth |
| 2021/0232750 A1 | 7/2021 | Gray |

OTHER PUBLICATIONS

"Rarity", downloaded from <URL: https://mtg.fandom.com/wiki/Rarity>, available online Aug. 23, 2020 (Year: 2020), 2 pages.
Febrero, Pedro, "Dapper Labs Founder Discusses CryptoKitties and Digital Collectibles", downloaded from <URL: https://coinrivet.com/it/dapper-labs-founder-discusses-cryptokitties-and-digital-collectibles/>, posted online on Nov. 18, 2019 (Year: 2019), 6 pages.
Hughes, Jonathan E., "Demand for Rarity: Evidence from a Collectible Good", downloaded from <URL: https://spot.colorado.edu/~jonathug/Jonathan_E._Hughes/Main_files/Rarity_latest.pdf>, (Year: 2021), 34 pages.
NBA, "NBA's Top 100 Plays of the Decade", downloaded from <URL: https://www.youtube.com/watch?v=t22flliJLTQ>, posted Jan. 1, 2020 (Year: 2020), 2 pages.
PSA Blog, "Factors That Impact Trading Card Value", downloaded from <URL: https://blog.psacard.com/2020/05/14/factors-that-impact-trading-card-value/>, posted May 14, 2020 (Year: 2020), 4 pages.
Roham's Twitter, downloaded from <URL: https://twitter.com/rohamg/status/1156583602278273025?ref_src=twsrc%5Etfw%7Ctwcamp%5Etweetembed%7Ctwterm%5E1156583602278273025%7Ctwgr%5E%7Ctwcon%5Es1_&ref_url=https%3A%2F%2Fcoinrivet.com%2Fit%2Fdapper-labs-founder-discusses-cryptokitties-and-digital-collectibles%2F>, Jul. 2, 2019 (Year: 2019), 3 pages.
Wealthsimple, "How to Buy Fleeting Moments in Sports History", Wealthsimple Magazine, Nov. 27, 2020 (Year: 2020), 14 pages.

(56) References Cited

OTHER PUBLICATIONS

Ciampaglia, Dante, "Topps BUNT Takes Card Collecting Digital", Sports Illustrated Kids, published Mar. 27, 2014, accessed Jan. 27, 2022 (Year: 2014), 2 pages.

Joshua, Cameron, "Topps BUNT: Baseball Collecting in Real-Time", Gold Card Auctions, Mar. 5, 2021, accessed Jan. 27, 2022 (Year: 2021), 8 pages.

SCUncensored, "Making Sense of the New 2016 Topps Bunt Scoring", Digital Card Central, published Mar. 25, 2016, accessed Jan. 27, 2022 (Year: 2016), 3 pages.

Topps, "BUNT Tips: How PTS Work", Topps Digital, published Mar. 31, 2015, accessed Jan. 27, 2022 (Year: 2015), 5 pages.

Topps, "Rewards Program FAQ", Topps, updated Apr. 1, 2019, accessed Jan. 27, 2022 (Year: 2019), 8 pages.

\* cited by examiner

SYSTEM AND METHOD FOR CREATING, MANAGING, AND DISPLAYING 3D DIGITAL COLLECTIBLES

CROSS-REFERENCE TO RELATED APPLICATIONS

This application is a continuation of U.S. patent application Ser. No. 17/229,455, filed Apr. 13, 2021, entitled "SYSTEM AND METHOD FOR CREATING, MANAGING, AND DISPLAYING 3D DIGITAL COLLECTIBLES", which is hereby incorporated herein by reference in its entirety.

FIELD OF THE INVENTION

The field of the invention relates to a platform for creating, managing, and displaying 3D digital collectibles of sports plays or other events.

BACKGROUND OF THE INVENTION

Physical collectibles, such as baseball cards, are known. Recently, digital collectibles have also been developed. However, the technology related to such digital collectibles is limited. For example, known digital collectibles are often static, two-dimensional, images. These and other technical limitations and drawbacks exist with known collectibles.

BRIEF SUMMARY OF THE INVENTION

According to an aspect of the invention, there is provided a system and method for creating, managing, and displaying a 3D digital collectible including, a 3D digital collectible including at least one digital media file and associated data. A digital media file may relate to a visual representation of an event during an entertainment experience, such as a video highlight or related images, and the data may be data associated with the event, experience, and/or the digital media file.

According to another aspect of the invention, the 3D digital collectible may include a digital media file (e.g., a video file) or set of digital media files, representing an event (e.g., a sports play or other events as detailed below), data relating to the event and/or other content. The digital media files, data and/or other content may be stored in a system memory associated with the server. The 3D digital collectible may be a virtual, three dimensional n-sided structure (where n is preferably greater than 3), where the n-surfaces may be configured to form an n-sided 3D shape (e.g., a cube, pyramid, octagon, or other 3D shape). According to some embodiments, the 3D digital collectible includes at least one digital media file or set of digital media files representing an event rendered on a representation of at least a first of the n surfaces data relating to the event rendered on at least a second surface thereof and other content on one or more other surfaces. Each surface may include a combination of digital media files, data and/or other content. The digital media file may be video clip of the event or a portion thereof that can be played automatically via a media player associated with the display.

According to another aspect of the invention, there is provided a platform for creating, managing and displaying 3D digital collectibles. The platform may include a computer server including a processor programmed with computer instructions including at least an administration module, a display generator, a media player. The platform may also include an associated computer memory that stores a data structure comprising media files, associated data, and other content and an association therebetween, along with rules that define what is to be displayed on the 3D digital collectible, metadata relating to events and other information.

According to another aspect of the invention, the platform comprises a display generator for generating graphical user interfaces for displaying a representation of the 3D digital collectible in accordance with the rules and a media player for playing the digital media files included with the 3D digital collectible based on scripted or user selected commands. The interface may be configured to display the 3D digital collectible as a virtual, three dimensional n-sided structure discussed above.

According to another aspect of the invention, based on a set of rules and/or data, the display generator may be configured to depict a representation of a media file on at least one surface of the 3D digital collectible (e.g., when a representation of a first surface of the 3D virtual display element is forward facing) and the at least some of the data or other content on another surface or surfaces of the 3D digital collectible when that surface of the 3D digital collectible is forward facing. Forward facing may refer to when a surface of the 3D virtual display element is displayed as user facing when viewed from the perspective of a user, such the surface, or at least a portion thereof is viewable by a user looking at the display on which the 3D virtual display element is rendered.

According to another aspect of the invention, the 3D virtual display element representing the 3D digital collectible may be dynamic, such that it is rotatable to display one or more of the surfaces and the associated content (e.g., media file, data and/or content) assigned to that surface.

According to another aspect of the invention, the interface may be further configured such that when a surface of the 3D digital collectible depicting a representation of a media file is forward facing, a script or user command may cause the media player to play one or more media files representing the event. The digital media files may comprise a video clip of the event or multiple clips of the event from different perspectives. The multiple clips may be associated with the collectible in a data structure stored in the memory. The multiple clips may be played sequentially (e.g., in accordance with a script) or they may be stitched together in a specified order to create a single file.

According to another aspect of the invention, the event may include a highlight from any type or category of experience, including without limitation any a sporting match. In the context of a sporting match, the highlight may include a video clip of the highlight, such as a player dunking a basketball or any other event from any type of sports match). The events are not limited to sports. The event may be video or other form of capture of any of a number of other experiences, including without limitation, sports, athletic events, esports and other competitions or other participatory experiences, artistic or theatrical productions (such as a show, play, concert, opera or other production), an awards show, a television show, movie, game, streaming media, social media or other entertainment experience, an information experience such as a speech, news report, political debate or other information experience other categories of events or experiences. The platform described is intended to cover a wide variety of event types from a wide variety of experiences.

According to another aspect of the invention, various types of media files, data and other content may be associated and stored with the event. A first type of data may include event data that describes the event itself. In the context of a sporting match, the event data may include the player, the type of action (e.g., a dunk, block, steal or other action), the date of the event, and other event data. A second type of data may include actor data relating to the person captured in the event. For example, in the context of a sporting match, the actor data may include the player's age, hometown, college, statistics and other actor-related data. A third type of data may include context data that describes additional information about the context of the event. For example, in connection with a sporting match, the context data may include the teams that were playing when the event was captured, where the game was being played, the score of the game, and other context data). The media file, the various associated types of data and other items associated with an event may be collectively referred to as content. In some embodiments, the content is stored in memory in associated with the event (or an event identifier) and at least some of the content may be selectively displayed on the 3D visual display element in accordance with a set of rules and/or metadata.

According to another aspect of the invention, the data associated with an event may also include metadata. Metadata may include information specified in connection with the creation of the digital collectible that specifies the content to be displayed and the manner in which the content should be displayed, such as what content should be displayed, where the content should be displayed (e.g., which surface), and how the data should be displayed. Other metadata may include information associated with the classification of the digital collectible or other information relating to the collectible.

According to another aspect of the invention, the process of creating a 3D digital collectible may include specifying the content to be displayed on the 3D digital collectible and the surfaces to which the data is to be assigned.

The above stated aspects, as well as other aspects, features and advantages of the invention will become clear to those skilled in the art upon review of the following description. It should be understood that the description and specific examples, while describing several exemplary embodiments, are intended for purposes of illustration only and are not intended to limit the scope of the disclosure.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF THE INVENTION

Figure 1A:
FIGS. 1a-1e shows a 3D digital collectible according to some embodiments of the invention.

Exemplary embodiments of the invention will now be described below by reference to the attached Figures. The described exemplary embodiments are intended to assist the understanding of the invention and are not intended to limit the scope of the invention in any way. Like reference numerals refer to like elements throughout. The examples are provided in connection with a sports event by way of example only. The platform may be used with other events including the other types of events referenced herein and other types of events.

The 3D Digital Collectible

Aspects of various types of events may include important portions which can be captured (as digital media files or other forms of capture). Such digital media files may include videos, images, sounds, and or other forms of capture that record a particular event during an experience. For example, in relation to sports, an event can be a particular play, such as a dunk in a basketball game, a goal in a soccer match, or a catch in baseball. In such examples, the event may be captured as a video, audio and/or other form of highlight, including from one or more perspective views, as a digital media file or files. The event can be of different durations appropriate to memorialize the event. An event may be part of a live-action experience, such as a sporting match or play, or a scripted or pre-recorded experience, such as a movie.

In an exemplary embodiment, a 3D digital collectible may be defined, generated, and rendered. The 3D digital collectible may include a digital media file (e.g., a video highlight clip) or a set of digital media files (e.g., different perspectives of the same event or a series of files before, during and/or after the event) representing an event, along with data relating to the event. An event may include all or any identifiable portion of an experience.

The 3D digital collectible may be a virtual, three dimensional n-sided structure (where n is preferably greater than 3), where the n-surfaces may be configured to form an n-sided 3D shape, such as a cube, pyramid, octagon, or other 3D shape. One or more of the surfaces may display one or more digital media files, or portions of such digital media files, and/or one or more portions of data (or other content) in a defined relationship stored in memory such that a particular side may display a digital media file or files, or portions thereof, a portion or portions of data, other content or combinations thereof.

Figure 1B:
Figure 1C:
Figure 1D:
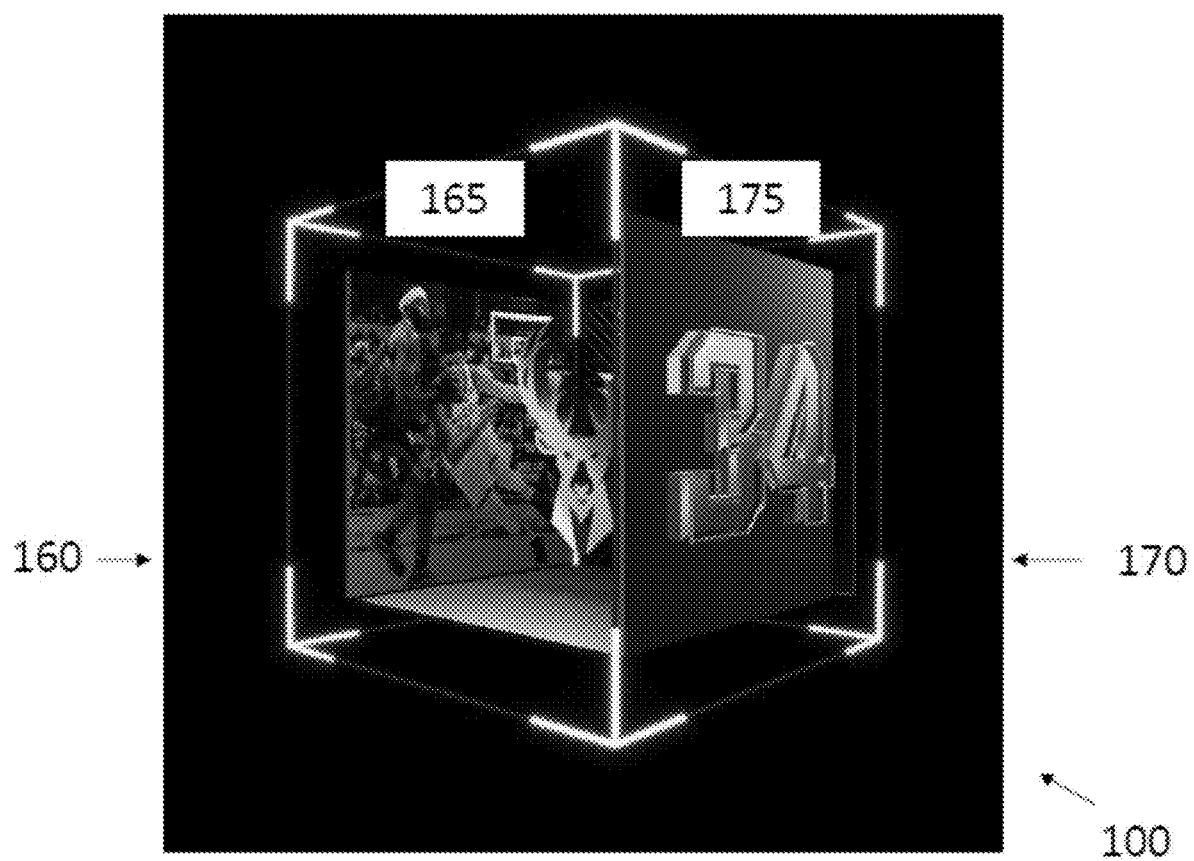
Figure 1E:

In the exemplary embodiment shown in FIG. 1a, a 3D digital collectible 100 is cube-shaped with six surfaces. In the perspective view of FIG. 1a, first surface 110 and second surface 120 are visible. First surface 110 has a digital media file 115, in this case a video clip. Second surface 120 has data 125, in this case the logo of the team of which a player in digital media file 115 is a member. FIGS. 1b-1e show further views of 3D digital collectible 100. In FIG. 1b, another surface of 3D digital collectible 100 is shown. Thus surface includes data, in this case a team logo and score related to the event to which the 3D collectible is related. In FIG. 1c, another surface of 3D digital collectible 100 is shown. This surface also includes data, in this case a team logo and a date and description of the event to which the 3D digital collectible is related. In FIG. 1d, another perspective view of 3D digital collectible 100 is shown. In this view, a surface 165 with different representation of a team logo is provided, such that it appears within collectible 100, along with a surface 175 with a number of the player shown in the video clip on surface 110. In this embodiment, the rear of surface 110 showing digital media file 115 may be seen through 3D digital collectible 100. In FIG. 1e, another surface of 3D digital collectible 100 with a team logo and copyright and system information is shown.

In various embodiments, the 3D digital collectible may be statically displayed in its virtual environment (e.g. on a computer display screen), or may be dynamically displayed, such that it is rotatable to display one or more of the surfaces and the associated content (e.g., a digital media file and/or data) assigned to that surface. Such dynamic display may be way of interactions with a user, in response to a predefined movement or movements (e.g., via a script or other computer code), or combinations thereof.

The digital media file may be any type of media, including still images, video, audio, and/or other media, or combinations of such media. Digital media files may include a single view, audio track, or other recording, or composites of multiple views, audio tracks, or other recordings, such as a composite video showing different perspectives of the event, such as different camera views of a sports play or other event. The digital media files may also include multiple views, audio tracks, or other recordings of the event from different perspectives, times, or durations that may be played sequentially and/or in other order. Such sequential play can be implemented by user interactions with a list of the multiple views, audio tracks, or other recordings, by accessing the multiple views, audio tracks, or other recordings in accordance with a script, or by stitching together the multiple views, audio tracks, or other recordings into a single digital media file. In this regard the composite or sequential digital media files may include different types of files (e.g., they may include one or more of a video file, audio file, or other recording). Portions of a single digital media file may also be identified, separated, and used as individual digital media files in the manner described herein (e.g., a digital media file may be sequentially divided with different portions considered as different digital media files). For example, a single digital media file may be sequentially divided and provided on different surfaces of the 3D digital collectible.

The data relating to the event may include event data that describes the event itself. Using a sporting match as an example, event data may include such information as the player's name, the type of play (such as a dunk, block, or steal), the date and/or time of the event, and other event data. A second type of data may include actor data relating to the person captured in the event. Again using a sporting match as an example, actor data may include such information as the player's statistics, measurements, position, age, experience, hometown, college, draft selection, or other actor (or actors) data. A third type of data may include context data that describes additional information about the context of the event. Again using a sporting match as an example, context data may include the teams that are playing, the location of the game, the score of the game, the sports league, the sports season, and context data. The digital media file and any related data and/or other content may be collectively referred to as content.

Further exemplary embodiments of context data include information related to an entertainment experience from which the event is drawn, situational information related to the entertainment experience, the subject of the experience, and/or information related to the digital media file. For example, context data related to a sporting match may include the number of teams, the box score, game statistics, seasonal averages for the player, media about the game, and other context data. In the sporting match example, the context data may relate to one or more players or teams that are represented in a digital media file.

The various forms of data may be associated with a digital media file in any known manner, such as by tags, attributes, metadata, pointers and/or other associations. Data may be stored in a data structure in one or more databases. The data structures may link an event with media files, data, content and metadata. The event and/or digital media file can be searched based on information associated with the event or the digital media file.

Data may also include metadata. Metadata may include information specified in connection with the creation of the 3D digital collectible that specifies attributes of the digital collectible. The attributes may include the configuration of the digital collectible (e.g. the number of sides) the manner in which content should be displayed, such as what content should be displayed, where the content should be displayed (e.g., on which surface of the n-shape), and how the content should be displayed, including in relation to other content. Other attributes of the digital collectible may be used.

Metadata may also include information associated with the uniqueness or classification of the scarcity of the digital collectible. For example, a collectible may be a one of a kind instance of an event or there may be a predetermined number of instances or other methods for determining a number of instances. In any case, the digital collectible may be identified by a serial number or other unique value that uniquely identifies a particular 3D digital collectible, along with a unique identifier for the instance (e.g., 1 of 1 or 1 of 10, etc.) as necessary.

Scarcity may be represented by a classification based on the number of instances. For example, more than 1000 instances may be a first classification, 500-1000 may be another classification, 100-500 may be another classification, and so on. Other numbers may be used to categorize scarcity classifications. The uniqueness or scarcity (e.g., the number of instances) can be set for an individual 3D digital collectible as part of the initial creation process in defining the collectible. The metadata may include data that dictates how the 3D digital collectible is rendered for display based on the scarcity of the 3D digital collectible. For example, data relating to the uniqueness or scarcity of the 3D digital collectible can be displayed on the collectible, or other displayed features of the 3D digital collectible may relate to rarity or scarcity, such as the colors, shading, material, textures, lighting and/or visual display indicators that depict a scarcity classification.

The digital media file and data may also be created based on another digital media file or data. For example, a digital media file including a graphic and/or sound may be generated based on a digital media file including a video. As such, 3D digital collectibles can include one or more related digital media files and data.

System

Figure 4:
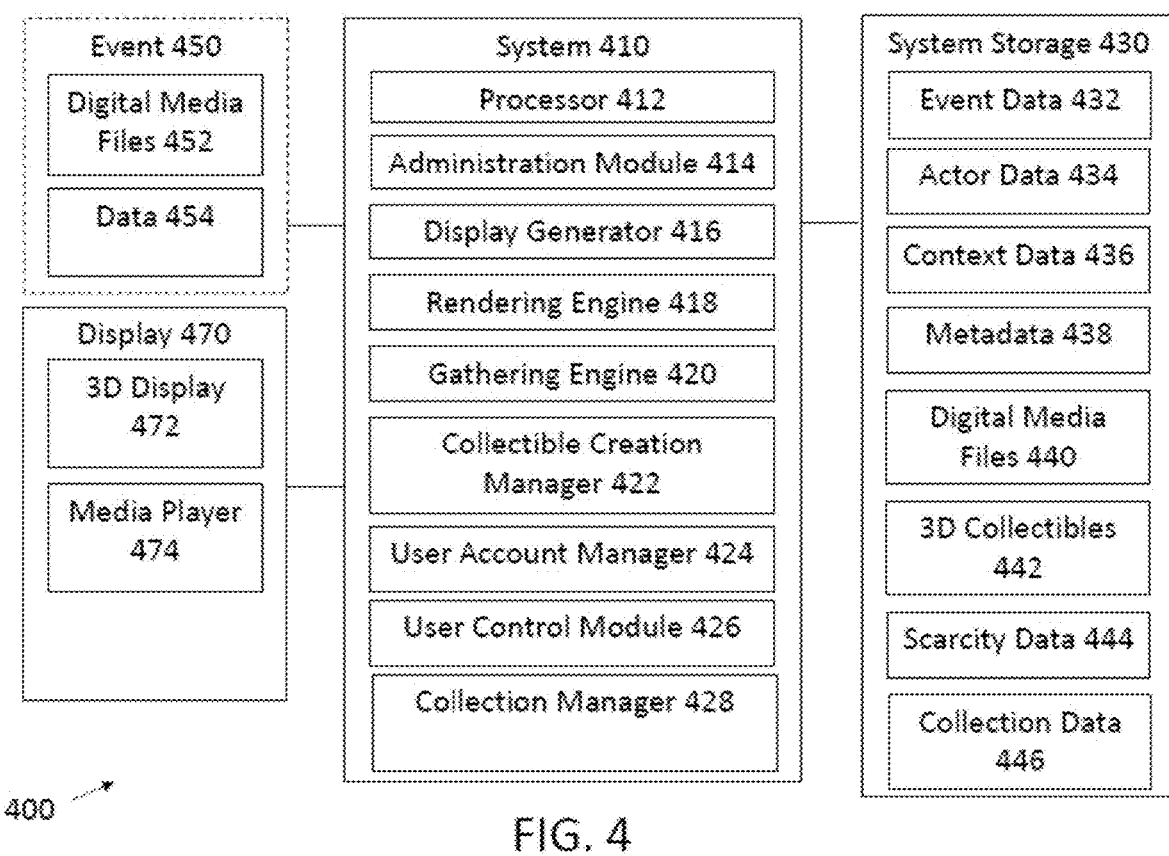
FIG. 4 shows aspects of a 3D digital collectible management system according to some embodiments of the invention.

A platform 400 for creating, managing, storing, rendering, and displaying 3D digital collectibles according to an exemplary embodiment of the invention is shown in FIG. 4. FIG. 4 shows system 410 with various modules and engines for defining, generating, and rendering a 3D digital collectible, system storage 430 for storing data, digital media files, 3D collectibles, and collection information, and display 470 for displaying the 3D digital collectible to a user.

System 410 may include a computer server including a processor 412 programmed with computer instructions including an administration module 414, a display generator 416, a rendering engine 418, a gathering engine 420, a collectible creation manager 422, a user account manager 424, a user control module 426, and a collection manager 428. Platform 400 may also include a display 470 with 3D display 472 and media player 474. Platform 400 may also include an associated computer memory or system storage 430 that stores a data structure comprising event data 432, actor data 434, context data 436, metadata 438, digital media files 440. 3D collectibles 442, scarcity data 444, and collection data 446, associated data/content, and particular association(s) therebetween, including rules that define what is to be displayed on the surfaces of the 3D digital collectible. The components of the systems may be co-located or distributed.

Platform 400 may include tools to define and create a 3D digital collectible, including administration module 414 that manages and tracks ownership of 3D digital collectibles by particular users, gathering engine that collects digital media files and data from event 450 and/or other data sources, and collectible creation manager 422 that creates 3D digital collectibles and defines their data structures and relationships. User account manager 424 is also provided to allow users to create and manage accounts to interact with system 410, and user control module 426 that provides various controls to users to perform any of the steps herein.

As part of the process for creating a 3D digital collectible, gathering engine 420 may gather digital media files 452 and data 454 related to an event, either automatically or pursuant to a specific user request. This gathering may include obtaining necessary rights to the digital media files 452 or data 454. Gathering engine 420 may then store collected digital media files 452 in system storage 430 as stored digital media files 440. Gathering engine 420 may also store data 454 in system storage 430 as event data 432, actor data 434, or context data 436, as appropriate. Gathering engine 420 may also gather and store event data 432, actor data 434, and context data 436 from other sources related to event 450, such as other databases or data services related to news, statistics, sports leagues, etc.

Collectible creation manager 422 may use the stored digital media files 440 and data 432, 434, 436, and 438 to create a 3D digital collectible and store it in system storage 430 as a stored 3D digital collectible 443. Each stored 3D digital collectible 440 may include a globally unique identifier. Collectible creation manager 422 provides functionality to specify the type of 3D digital collectible (e.g., what n-sided 3D shape is to be used), visual design attributes of the 3D digital collectible (e.g., colors, shading, material, textures, and/or lighting), which digital media file(s) 440 and data 432, 434, 436, and 438 are to be displayed on the 3D digital collectible, how the digital media file(s) and data are to be displayed (e.g., what surfaces the content is to be assigned, how the content is to be shown, played, or listened to, any sequence of display, etc.), a scarcity classification of the 3D digital collectible, obtained from scarcity data 444, and any other of the related elements discussed herein. Collectible creation manager 422 may provide a GUI for a user to create a 3D digital collectible and select each of the above parameters, or may operate in a partially or fully automatic manner. After each of the parameters above are selected, collectible creation manager 422 may establish associations or links between the 3D digital collectible (such as by using its unique identifier) and any applicable digital media file(s) 440, data 432, 434, 436, or 438, and any other applicable data or design elements, and creates a data structure in memory associating these elements. This data structure is associated with the 3D digital collectible being created and is stored as metadata 438 in system storage 430. In this manner, each 3D digital collectible created by collectible creation manager 422 is unique based on the aspects of the embodiments described herein.

Collectible creation manager 422 may also track and store in metadata 438 all relationships between event data 432, actor data 434, context data 436, and digital media files 440 that have been identified with regard to any other 3D digital collectible or are determined to otherwise be related during collection (e.g., event data such as a play may be linked to context data such as the related sports league) such that smart options may be presented by collectible creation manager 422 to a user during creation of the 3D digital collectible.

Figure 5:
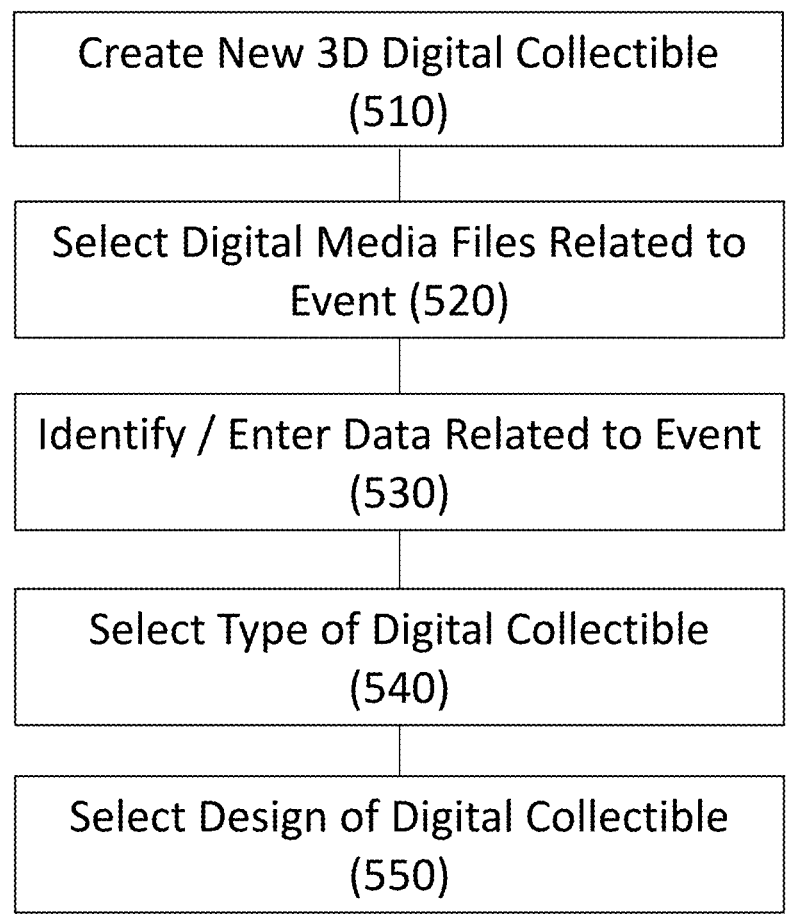
FIG. 5 shows aspects of a 3D digital collectible creation process according to some embodiments of the invention.

An exemplary 3D digital collectible creation process is illustrated in FIG. 5. The creator (e.g., an user with an account on system 410 as tracked by user account manager 424) may employ any user interface (e.g., a GUI provided by collectible creation manager 424) or other input mechanisms to make the following selections and perform the following data entry. In the first step 510, a user may indicate his desire to create a new 3D digital collectible in connection with an event, either from preexisting media or as part of a live event. A unique identifier for the 3D digital collectible may be selected or generated at this stage. In Step 520, one or more digital media files related to the event (e.g., digital media files 440) may be selected and obtained, including obtaining any necessary rights to show, play, or display the digital media file. In step 530, data, such as event data 432, actor data 434, or context data 436 (e.g., or other data or content) may be identified, obtained, or entered and stored in a data structure associated with the 3D digital collectible (e.g. as metadata 438). At step 540, the creator may select visual characteristics of the digital collectible, such as a cube or other n-sided 3D shape, and store them in the data structure associated with the 3D digital collectible (e.g. as metadata 438). In step 550, the creator may select how the digital media files and/or data are displayed, including how the digital media files and data are displayed in relationship to each other and the various formats and features of the digital collectible discussed herein, and store them in the data structure associated with the 3D digital collectible (e.g. as metadata 438). Additionally, with regard to digital media files that include video clips, the creator may identify a picture that can be displayed on the surface of the 3D digital collectible as a representation of the digital media file. In various embodiments, the picture may be a frame of the video clip or any other picture the creator may select. The creator may also specify that different pictures appear with regard to the digital media file in different situations, such as when the 3D digital collectible is in different orientations or after the digital media file has been played once.

According to another aspect of the invention, rules can be created to set forth what digital media files and data is presented on the 3D digital collectible as part of the 3D digital collectible creation process, such as in steps 520, 530, and 540 in FIG. 5. For example, the 3D digital collectible may be designed to present a media file on one surface of the 3D digital collectible (e.g., when a representation of a first surface of the 3D virtual display element is forward facing) and related data on another surface or surfaces of the 3D digital collectible when that surface of the 3D digital collectible is forward facing. As a concrete example of this functionality, for a sporting event, a highlight video can be rendered on a first surface and a team logo can be rendered on an opposite surface.

Rules may be stored in metadata 438, and may be accessed by collectible creation manager 422 during creation of the 3D digital collectible to partially automate creation, such as by automatically populating data 432, 434, or 436 based on selection of a particular digital media file 440, using predefined relationships between these elements as discussed above. Rules may also enforce standardization of the appearance of 3D digital collectibles. For example, rules may define relationships between and among particular digital media files and data, and between particular surfaces of a 3D digital collectible, such that surfaces of a 3D digital collectible may be automatically populated with digital media files and data in any appropriate manner. Digital media files and data may also be classified or categorized by rules. In this manner, specific data (i.e. belonging to a specific classification) and/or digital media files may be rendered at specific surfaces of the n-surfaces of the 3D virtual element and can depend on data values.

Platform 400 may also include tools to display 3D digital collectibles, such as display generator 416 and rendering engine 418 for generating graphical user interfaces (GUIs) for displaying a 3D digital collectible for display therein to a user via 3D display 472 on display 470. For example, the 3D digital collectible (e.g. the digital media file and data) may be configured to be displayed as a 3D display element. The digital collectible can be represented as, or otherwise include, the 3D display element. The 3D display element can be in a virtual 3D graphical interface. The 3D display element can have n-surfaces which are combined together into an n-sided shape, (cube, sphere, pyramid, octagon, etc.). Each face or side of the of the n-sided shape can display at least one of the aforementioned digital media and/or data types. Each face or side of the n-sided shape can have associated digital media and/or context data of a specific type (for example, belonging to a specific classification of media, such as images, video, text, sound for playback, etc.).

The display generator 416 and rendering engine 618 may generate a GUI on display 470, the representation of the 3D digital collectible and a media player for playing the digital media file(s) included with the 3D digital collectible based on scripted or user selected commands. The interface may be configured to display the 3D digital collectible as the virtual, three dimensional n-sided structure discussed above. The display may be pre-rendered or rendered in real-time as it is being displayed. The 3D digital collectible may be rendered and displayed in any orientation, such as the perspective and plan views of FIGS. 1*a*-1*e*, may be stationary in one view, or may change orientation between views (e.g., rotate, translate, etc.) either automatically based on elapsed time, in reaction to a user interaction (e.g., mouse click, scroll bar movement, or touch interface), or both.

When a surface of 3D digital collectible that includes a digital media file is facing a user, the digital media may be displayed on that surface (or on an overlay, as discussed below). For example, in FIG. 1*a*, a digital media file is visible. If the digital media file is a video and/or audio track, display of the surface containing that digital media file also allows the video or audio to play. For example, in FIG. 1*a*, if the displayed digital media file is a video, it may play in the orientation shown.

In other embodiments, a separate media player may be generated in the GUI by display generator 416 and rendering engine 618 to play digital media files and/or data from surfaces of the 3D digital collectible, such as in an window or pop-up adjacent to the 3D digital collectible. The media player may also partially or fully overlay the 3D digital collectible, hover over a surface of the 3D digital collectible, or simply replace the 3D digital collectible in the GUI. The media player may automatically launch and begin playing when a surface of the 3D digital collectible with an appropriate digital media file is visible, or upon user command. The media player may be of any shape and orientation to play the media file. Additionally, the view of the media player can be changed by further user interaction. For example, the media player may be maximized on the user screen for easier viewing automatically or based on user command. Selectors may also be provided to perform other display changes, or to launch a separate viewer or application.

Figure 3A:
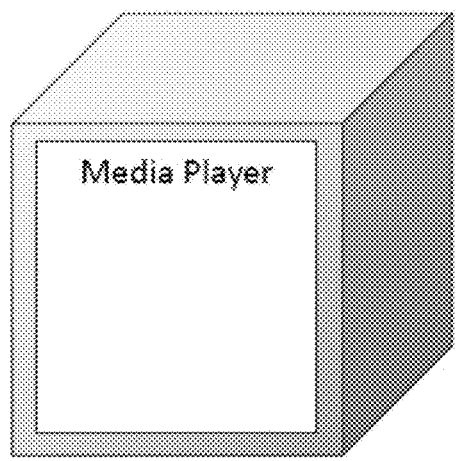
FIGS. 3a and 3b show a digital media playing applications according to some embodiments of the invention.
Figure 3B:
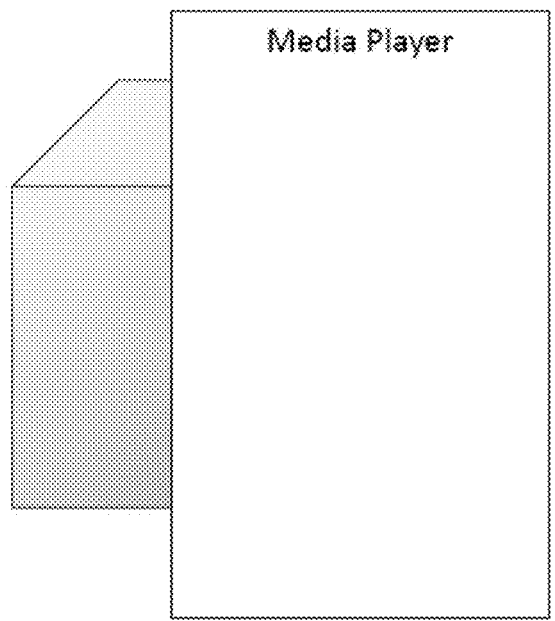

FIGS. 3A and 3B illustrate exemplary embodiments of media player 474. FIG. 3A provides the media player over the surface of the 3D digital collectible, while FIG. 3B shows the media player partially overlaying the 3D digital collectible. In either of these embodiments, the 3D digital collectible and media player may be provided in the same window, or in separate windows or popups. In any of the embodiments discussed above, the media player may be partially transparent such that portions of the 3D digital collectible under the media player are still visible. In any of the embodiments herein, various playback features may also be implemented to allow the user more control of the playback, such as play, pause, rewind, and replay buttons. Such controls may be placed on the surface where the digital media file is shown, on the media player, or may be arranged thereto or anywhere else in the GUI.

In the above embodiments, the GUI and/or the media player may be configured to play the digital media file upon a direct user request, or automatically (e.g., according to timing or positioning of the 3D digital collectible). For example, the GUI may be configured such that when a surface of the 3D digital collectible depicting a representation of a media file is forward facing, a script or user command may cause the media player to play one or more media files representing the event. As discussed above, the digital media files may comprise a video clip of the event or multiple clips of the event from different perspectives. The multiple clips may be associated with the collectible in a data structure stored in the memory. The multiple clips may be played sequentially (e.g., in accordance with a script) or they may be stitched together in a specified order to create a single file.

Figure 6A:
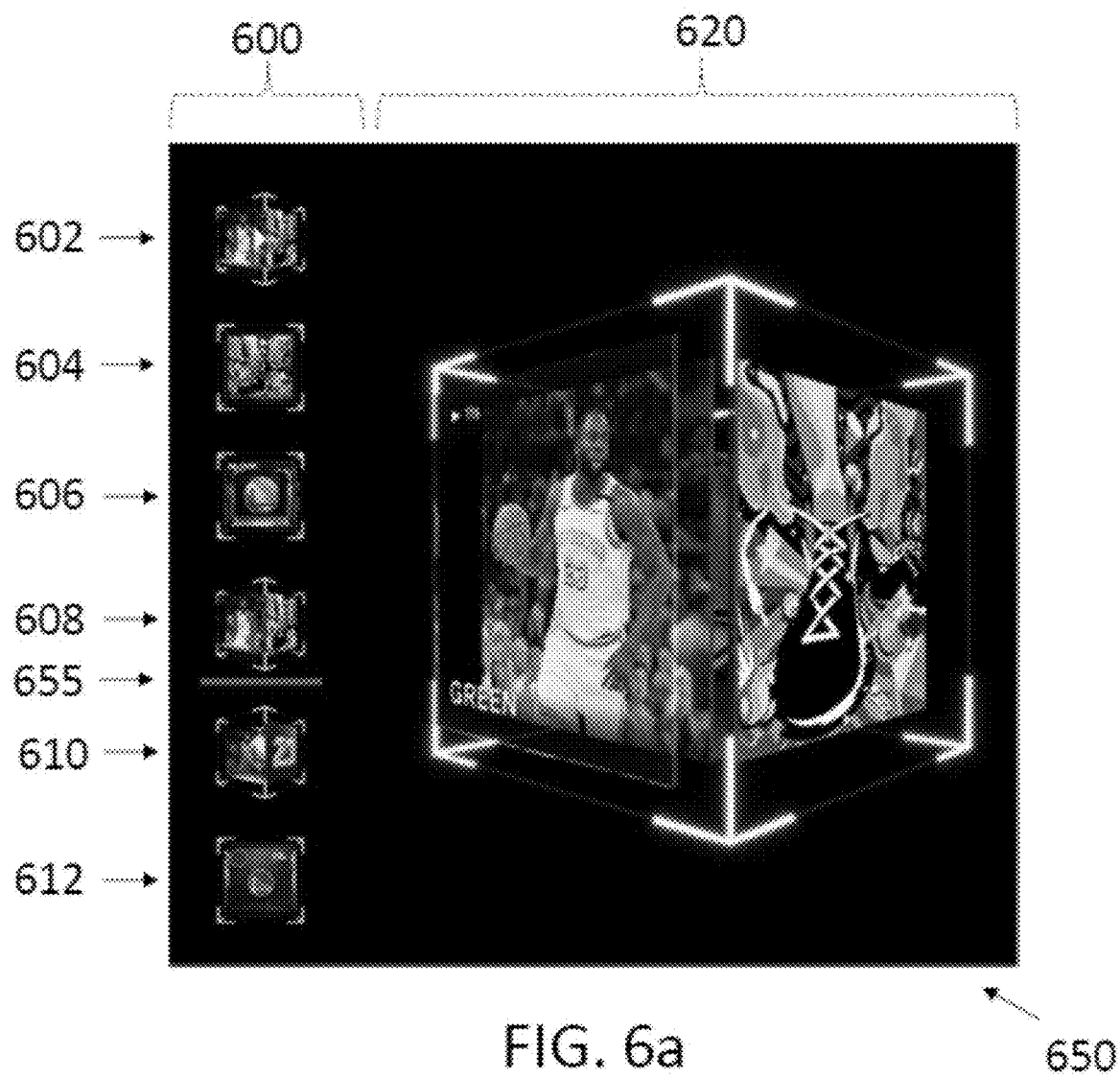
FIGS. 6a-6d show aspects of user controllable viewing tools according to some embodiments of the invention.
Figure 6B:
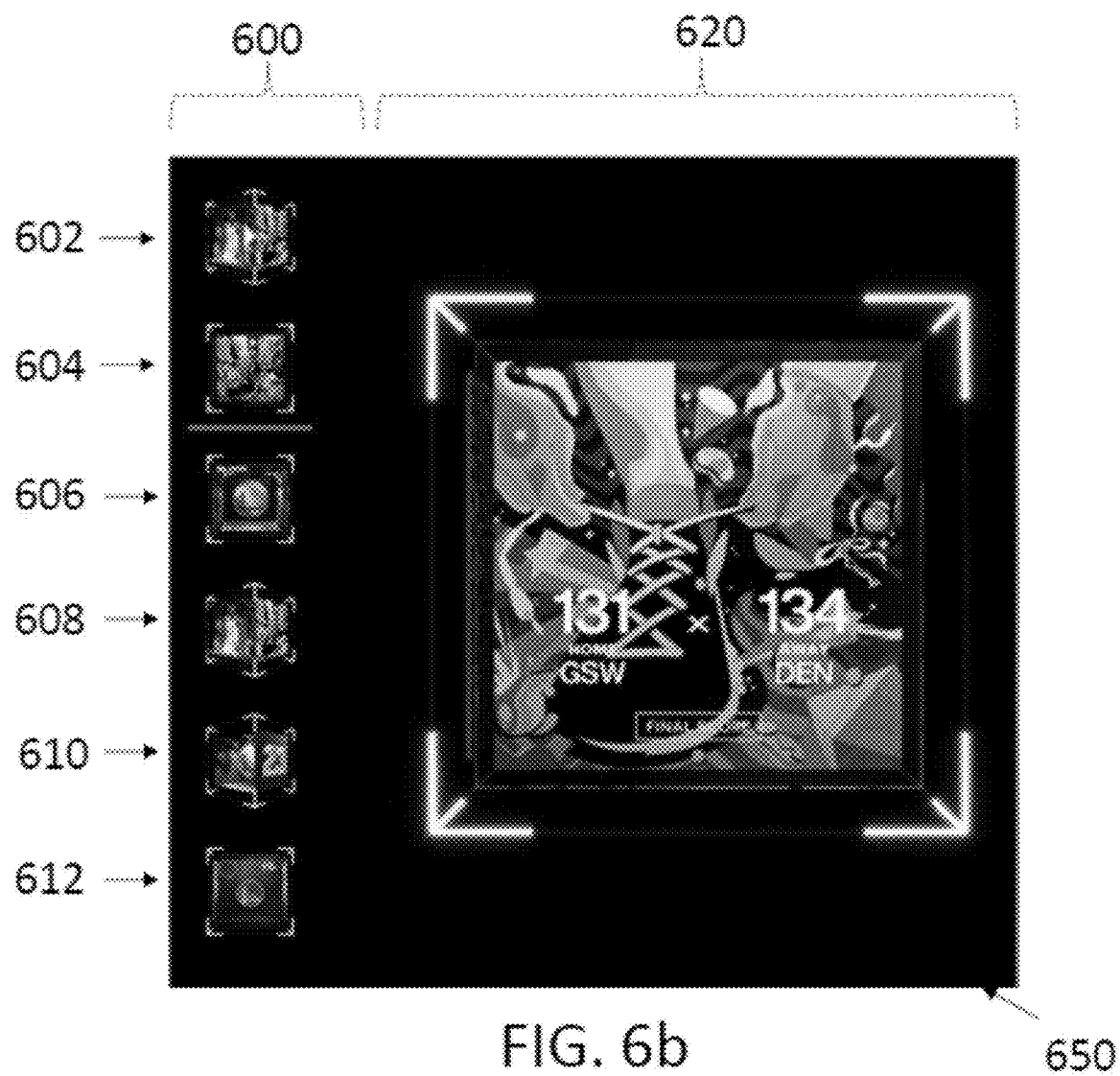
Figure 6C:
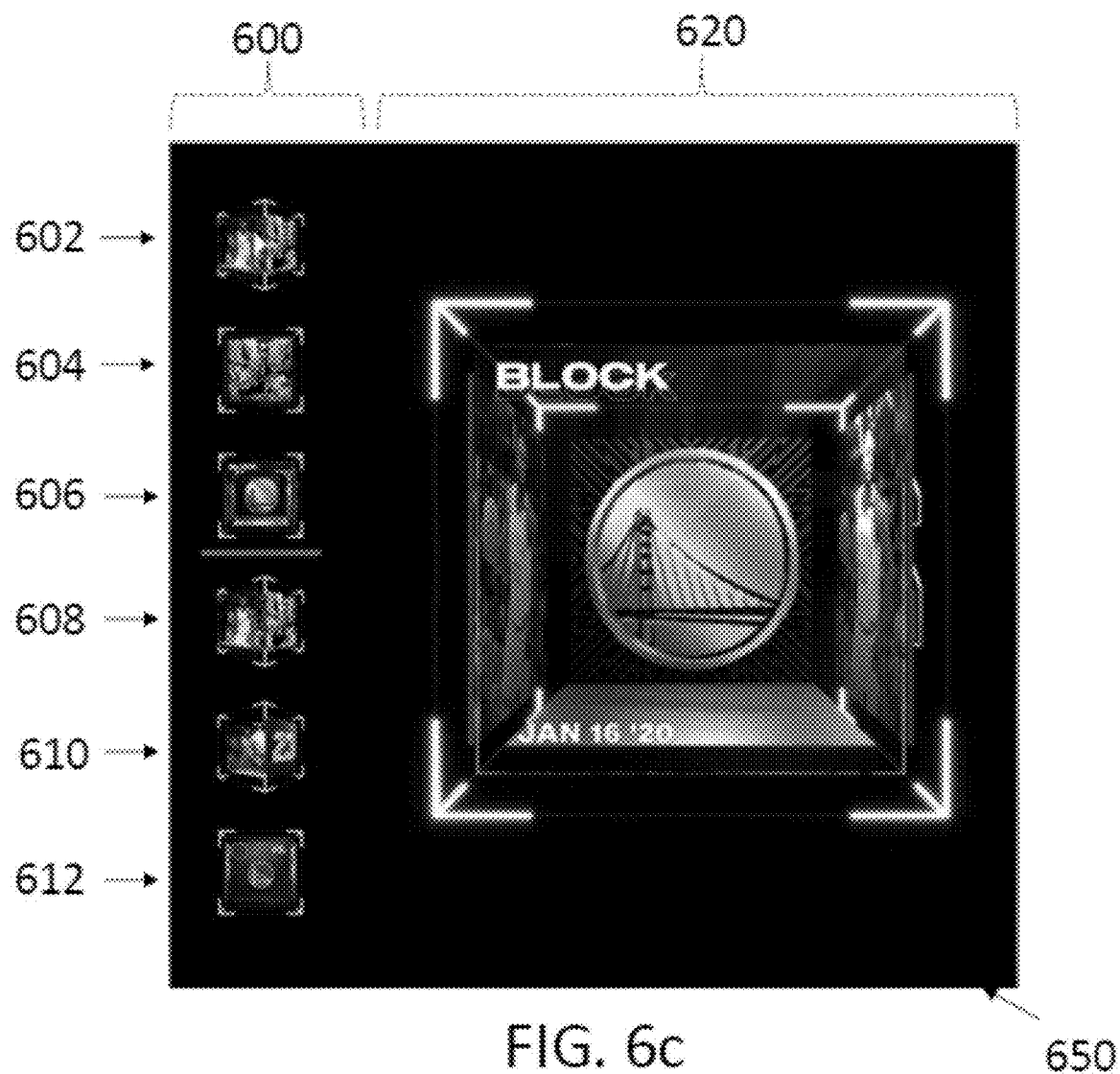
Figure 6D:
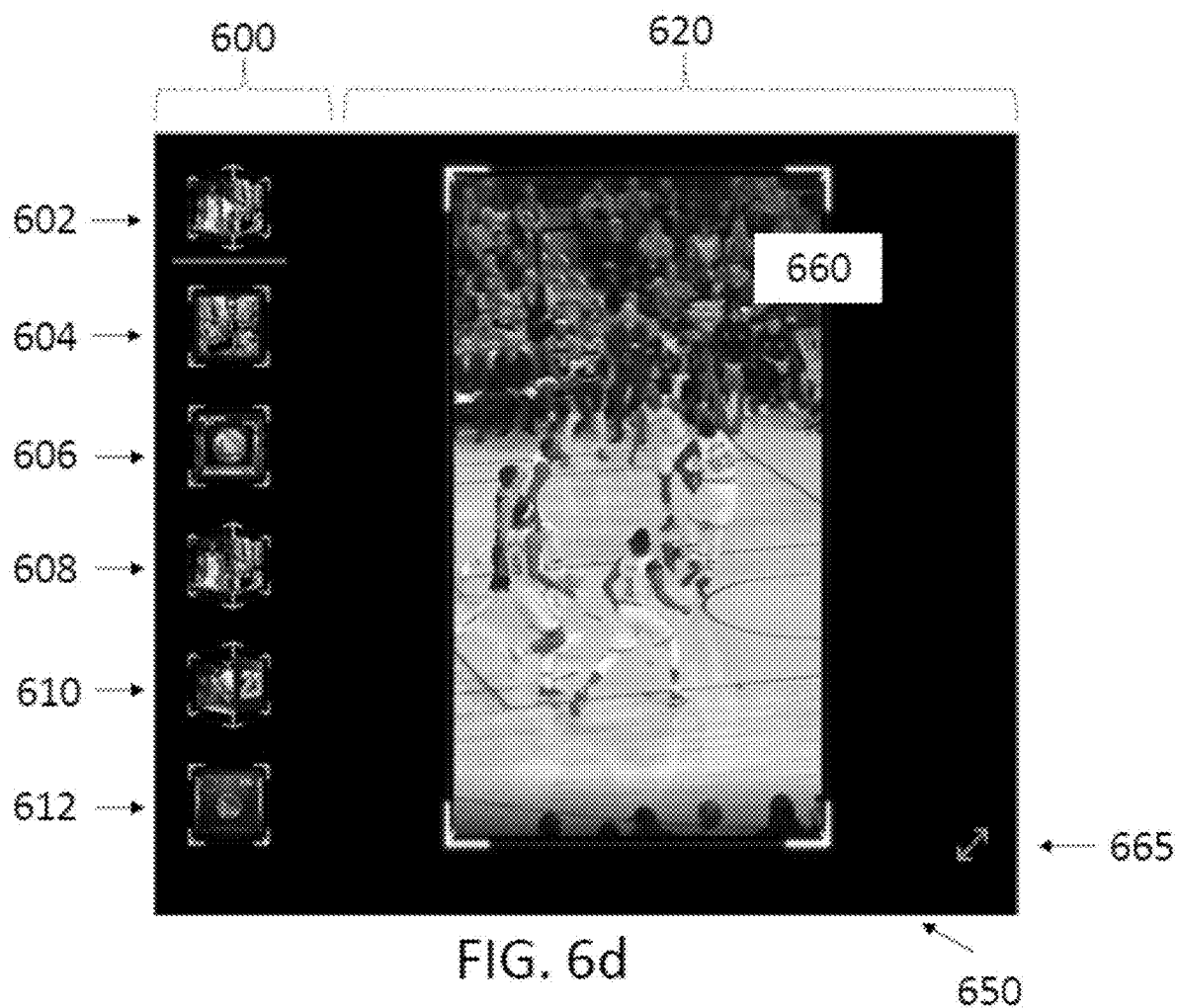

According to another exemplary embodiment, the GUI may be an interactive display. For example, in response to user input selections via the graphical user interface different surfaces of the n-sided display may be displayed. For example, as shown in FIGS. 6*a*-6*d*, GUI 650 may be configured to include a first display portion 600 with a set of icons 602, 604, 606, 608, 610, 612 and second display portion 620 that shows various views of a 3D digital collectible corresponding to the icons. As shown in FIG. 6*d*, media player 660 may also be launched in second display portion 620. Features of an interactive display are described in more detail in a U.S. application Ser. No. 17/229,430 filed Apr. 13, 2021, hereby incorporated by reference in its entirety.

Modifying the Shape of 3D Digital Collectibles

In still another example, the GUI may be configured to allow the user to manipulate the shape of the 3D digital collectible, and the displayed media can change to accommodate the shape. The data may also change and/or be updated depending on the user manipulation. In embodiments, manipulation of the shape can "unlock" display of specific digital media and/or data, and/or adjust data.

In yet another embodiment, the shape of the 3D digital collectible may change based on continued user interaction. For example, the shape of the 3D digital collectible may change based on the number of times it is accessed, displayed, traded, or other interactions or predetermined factors, or if the 3D digital collectible reaches a certain value. Alternatively, the shape of the 3D digital collectible may change if two or more 3D digital collectibles are combined to create new 3D digital collectible.

Managing a Collection of 3D Digital Collectibles

According to other aspects of various embodiments, a user may manage the display of multiple digital collectables within their account through collection manager 428. For example, in some embodiments, the digital collectables may be stored online (e.g., under control of the system), a user may create one or more collections of digital collectables and share a link or other identifier associated with the collection and other users may use the link or other identifier to view the collection(s). Data related to the collection may be stored as collection data 446. Collections are described in more detail in a U.S. application Ser.No. 17/229,430 filed Apr. 13, 2021, hereby incorporated by reference in its entirety.

Example 3D Digital Collectibles

FIGS. 2a-2m show further exemplary embodiments of 3D digital collectibles that include one or more of the features discussed above, along with various additional features.

Figure 2A:
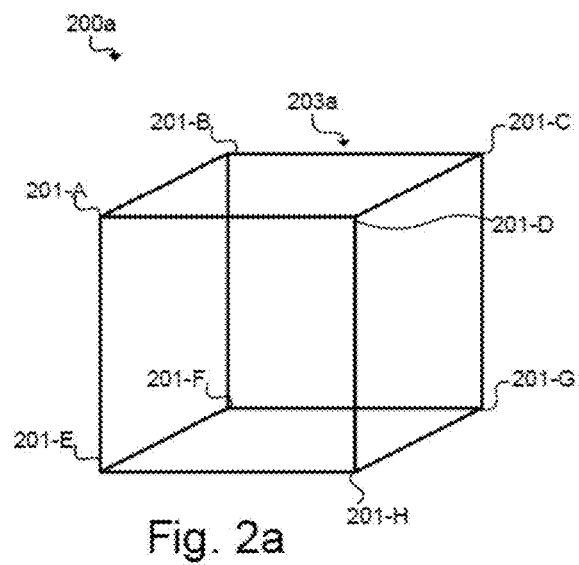
FIGS. 2a-2m show aspects of a 3D digital collectible according to some embodiments of the invention.

In FIG. 2a, exemplary 3D digital collectible 200a includes a 3D display element in the shape of a cube having vertices 201-A through 201-H defining 6 surfaces 203a (the n-surfaces of the example). This 3D display element may be a virtual 3D graphical interface. At least one digital media file and/or data (such as the event data, actor data, or context data described above) may be rendered on one or more of the surfaces. Although 3D digital collectible 200a is shown with 8 vertices and six surfaces, it is understood that 3D digital collectible 200a may have any number of vertices, surfaces, indentations, depressions, protrusions, etc.

Figure 2B:
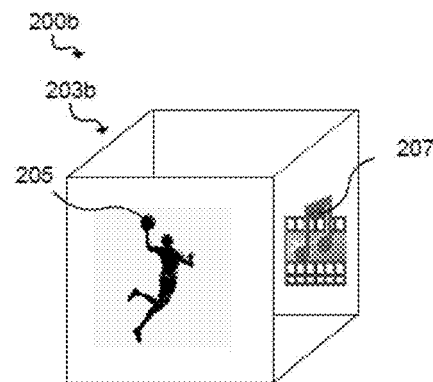

In FIG. 2b, exemplary 3D digital collectible 200b includes a first digital media file 205b (e.g. a video, image, and/or sound), and a second digital media file 207b (e.g. video, image, and/or sound) on particular surfaces (e.g. opposite or adjacent surfaces). In this embodiment, the digital media files 205b and 207b are associated with a live entertainment event. For example, first digital media file 205b includes a graphical representation of a play from a basketball game (such as a dunk or other score), and second digital media file 207b includes digital media related to the play represented in the first digital media file 205b (such as a video highlight of the play). As described above, the first and second digital media files may also be composites or two different sequential portions of an original digital media file that have been divided.

In exemplary embodiments, particular faces or sides of an n-sided 3D digital collectible may include at least one digital media file (such as those exemplified above) or at least a portion of data (such as the event data, actor data, or context data described above). Each of the faces or sides of an n-sided 3D digital collectible may include such digital media files or data, or a subset of the surfaces may include other information or data, or no information or data. The n-sided shape may have one or more edges and/or surfaces that can be defined by one or more colors, shading, lighting, and/or textures. The colors, shading, material, textures, and/or lighting can correspond to data values. It can also be understood that display of digital media and/or values for data can be presented in spatial and/or temporal arrangements, and/or at one or more faces of the n-sided shape. Each face or side of the n-sided shape can have associated digital media and/or metadata of a specific type. Each side may have one or more types of content and any piece of content may span multiple sides. Reference to content on a surface may include display of content on a portion of the surface.

In another exemplary embodiment, a 3D digital collectible may also include a substantially transparent overlay portion over at least one surface of the n-sided 3D shape. The overlay may display additional digital media files or data in relation to digital media files or data displayed on a surface of the n-sided shape. For example, a 3D digital collectible may display a digital media file of an event (e.g., a video of a dunk) on a visible one of its n surfaces and its overlay portion may display data related to the event (e.g., displaying the player's name overlaying the video of the dunk). The content to be displayed on the overlay portion, and the manner it is displayed, can be specified during the creation process in the manner discussed above.

Figure 2C:
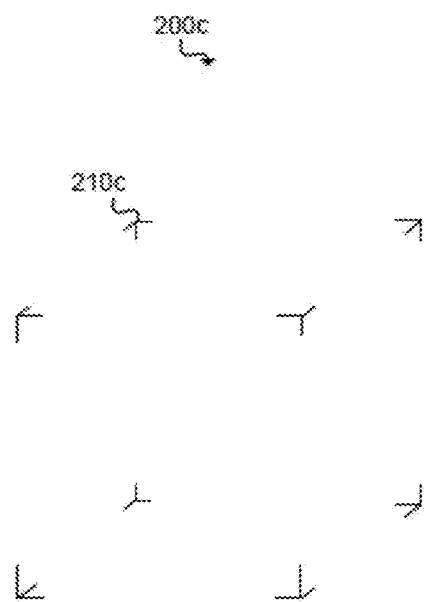

In FIG. 2c, an exemplary overlay related to 3D digital collectible 200c is shown. In this embodiment, the overlay is defined by one or more edges, or markers 210c that may be of a different transparency than the overlay. As is shown in FIG. 2c, an overlay can include surfaces defined by markers, for example at the corners of a side. Here, the overlay is defined by eight markers 210, such that each surface is defined by four markers 210c.

Figure 2D:
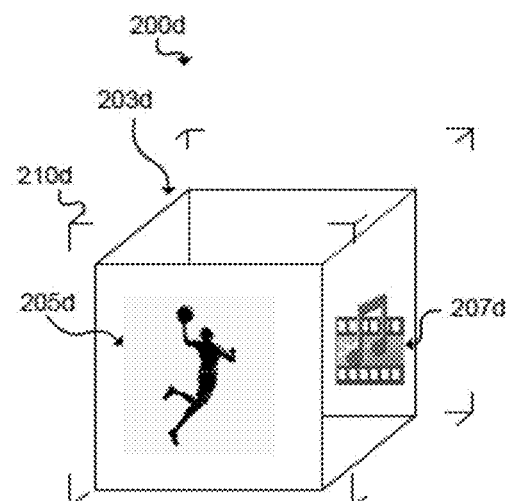

In FIG. 2d, the surfaces of the overlay are arranged in a cube shape about 3D digital collectible 200d with surfaces 203d including a first digital media file 205d (e.g. video, image, and/or sound), and a second digital media file 207d (e.g. video, image, and/or sound) displayed thereon. The overlay surfaces are defined by markers 210d. In exemplary embodiments, the overlay area can render or otherwise include portions of data (such as the event data, actor data, or context data described above) and/or additional digital media files.

The overlay can be 2-dimensional in front of a n-sided 3D display element, or a 3D shape that "surrounds" the n-sided 3D display element. The 3D shape of the overlay may be the same as the n-sided 3D display element or different. The overlay area may be movable, such as by the user sliding, translating, or rotating it, compared to the 3D display element, or in conjunction with the 3D display element.

Figure 2E:
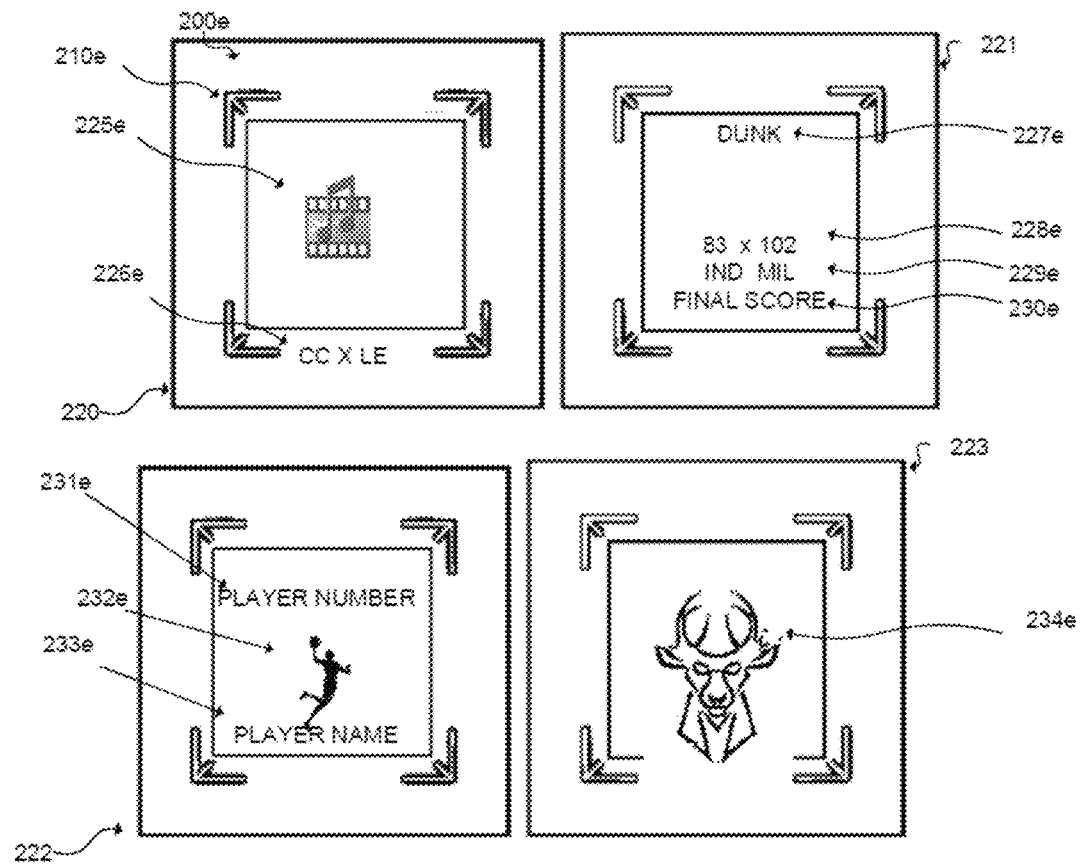

The exemplary embodiment of FIG. 2e demonstrates different perspectives of a user viewing 3D digital collectible 200e, including a first perspective 220 viewing a first side, a second perspective 221 viewing a second side, a third perspective 222 viewing a third side, and a fourth perspective 223 viewing a fourth side. As shown by the various perspectives, a display of a representation of a digital media file or various portions of data depend on which surface of the 3D display element is forward facing.

For example, the digital media collectible 200e of FIG. 2e includes a 3D display element and transparent overlay (defined by markers 210e) as previously discussed. As shown in the first perspective 220 viewing the first side of the digital collectible 200e, a first digital media file 225e can be rendered for display at a surface of the digital collectible. Further, data, such as the event data, actor data, or context data, can be rendered for display at the overlay.

When the digital collectible 200e (e.g. the 3D shape and/or the overlay area) is manipulated by the user, the information or data shown in the overlay area with respect to the first side, may not be depicted associated to the same side anymore, and/or can be associated to a side other than the data shown at the first side. In other words, after manipulation by the user, digital media 225e and data 226e can be depicted as belonging to other sides.

As shown in the second perspective 221 viewing the second side, one or more portions of data may be displayed) like the type of play 227e (e.g. dunk corresponding to a basketball play or move), the score 228 or other statistic, the team names 229, and other information 230e (such as the date or time for the entertainment experience, etc.). The second side of the digital collectible can also display other graphical data or digital media files.

As shown in the third perspective 222 viewing the third side, another portion of data may be displayed, such as additional context information like the player number 231e, in conjunction with another digital media file, such as an image of the player 232e, as well as other context information such as the player name 233e.

As shown in the fourth perspective 223 viewing the fourth side of the digital media collectible 200e, other portions of data or digital media files may be displayed, such as a logo for the team 234e.

Figures 2F, 2G, 2H, 2I:
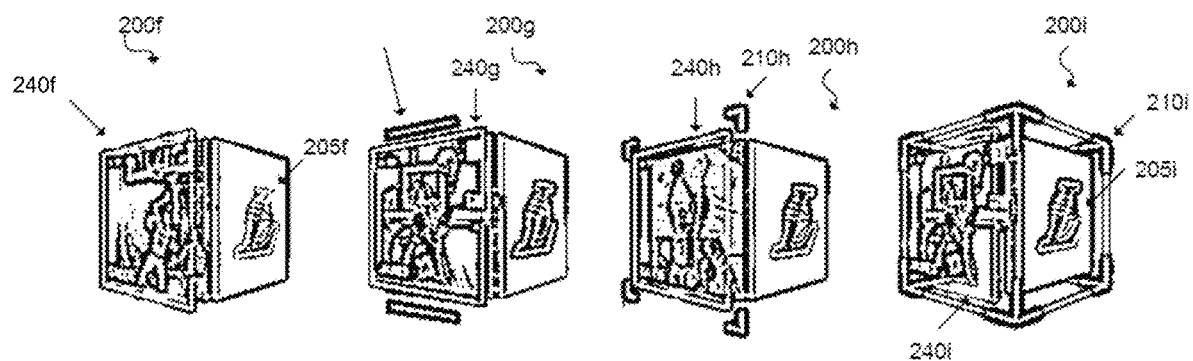

FIGS. 2f-2i show various embodiments of overlays. FIG. 2f shows exemplary 3D digital collectible 200f with a 2D transparent overlay 240f which overlays one side of the n-shape of 3D digital collectible 200f As shown in FIG. 2f, overlay 240f need not be defined by a non-transparent marker or edge. FIG. 2g shows exemplary 3D digital collectible 200g with 2D transparent overlay 240g which overlays one side of the n-shape of 3D digital collectible 200g, like the embodiment of FIG. 2f. In this embodiment, 2D transparent area 240g includes one or more edges or markers 210g. FIG. 2h shows exemplary 3D digital collectible 200h that is similar to the embodiment of FIG. 2g, but provides a 2D transparent overlay 240h including one or more markers 210h. Finally, FIG. 2i shows exemplary 3D digital collectible 200i that is similar to the embodiment of FIG. 2g, but which provides a 3D overlay 240i including one or more edges or markers 210i. In various embodiments, the type of overlay (e.g. attributes thereof, such as whether 2D or 3D, the surface of the n-shape that it overlays, the type and/or number of markers, etc.) can depend on the data associated with the 3D digital collectible, the event data, actor data, context data, and/or metadata. For example, the overlay type may depend on and correspond to the rarity or scarcity of the digital collectible.

Figures 2J, 2L:
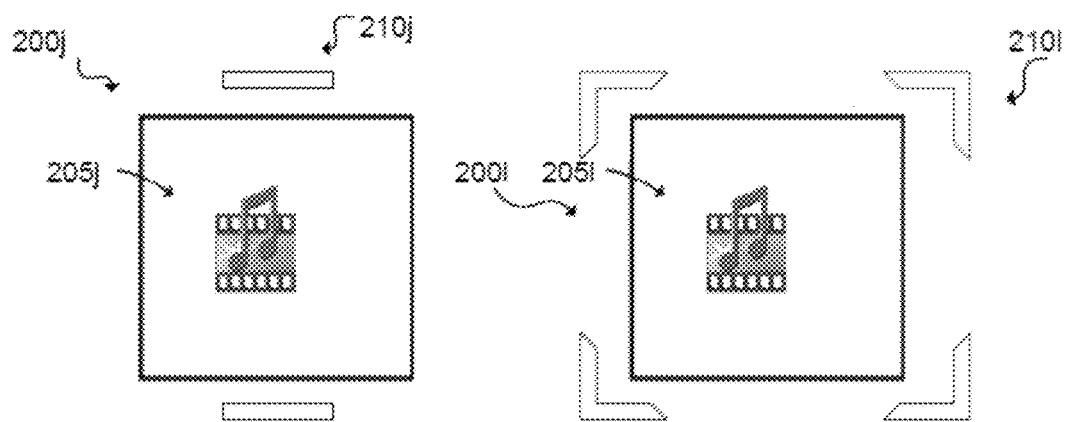
Figures 2K, 2M:
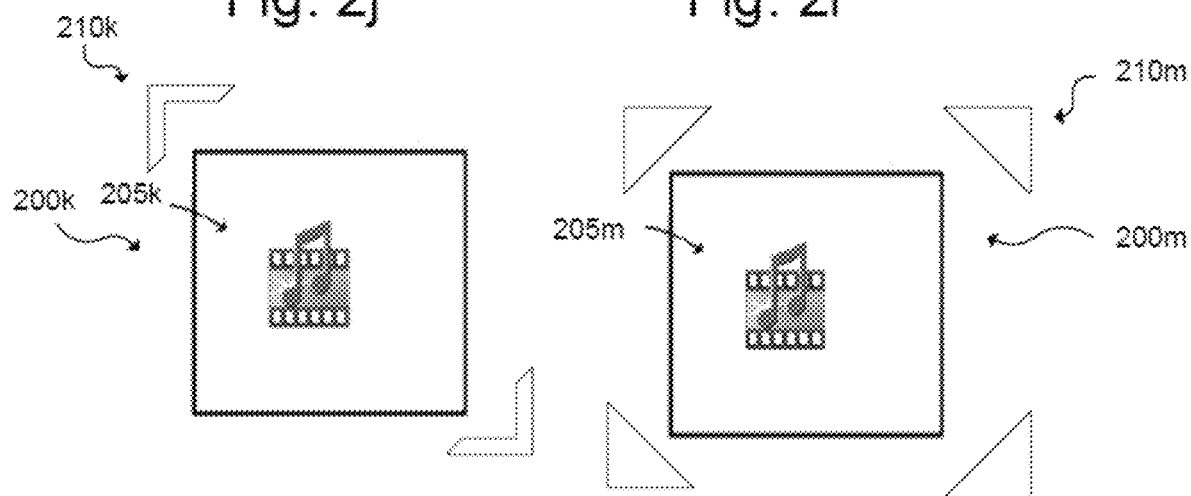

FIGS. 2j, 2k, 2l, 2m, depict exemplary embodiments of digital collectibles with various types of markers. FIG. 2j shows digital collectible 200j with media 205j and an overlay area including one or more bar-shaped edges or markers 210j. FIG. 2jk shows digital collectible 200k with media 205k and an overlay including one or more corner-shaped edges or markers 210k to frame the corners of the overlay. FIG. 210l shows digital collectible 200l with media 205l and overlay area including one or more corner-shaped edges or markers 210l that define one or more corners of the overlay area. Finally, FIG. 210m shows digital collectible 200m with media 205m and overlay area including one or more triangular-shaped edges or markers. Various additional shapes for markers may be used, as well as various combinations thereof.

Processing Devices and Processors

In some embodiments, the platforms, systems, media, and methods described herein, including system 400, include a processing devices, processors, or use of the same. In further embodiments, the processing device includes one or more hardware central processing units (CPUs) or general purpose graphics processing units (GPUs) that carry out the device's functions. In still further embodiments, the processing device further comprises an operating system configured to perform executable instructions. In some embodiments, the processing device is optionally connected a computer network. In further embodiments, the processing device is optionally connected to the Internet such that it accesses the World Wide Web. In still further embodiments, the processing device is optionally connected to a cloud computing infrastructure. In other embodiments, the processing device is optionally connected to an intranet. In other embodiments, the processing device is optionally connected to a data storage device. In accordance with the description herein, suitable processing devices include, by way of non-limiting examples, cloud computing resources, server computers, server clusters, desktop computers, laptop computers, notebook computers, sub-notebook computers, netbook computers, netpad computers, handheld computers, mobile smartphones, and tablet computers. In some embodiments, the processing device includes an operating system configured to perform executable instructions. The operating system is, for example, software, including programs and data, which manages the device's hardware and provides services for execution of applications. Those of skill in the art will recognize that suitable server operating systems include, by way of nonlimiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft Windows Phone® OS, Microsoft Windows Mobile® OS, Linux®, and Palm® WebOS®. In some embodiments, the processing device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the processing device is not powered. In further embodiments, the non-volatile memory comprises flash memory. In some embodiments, the nonvolatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein. In some embodiments, the processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active matrix OLED (AMOLED) display. In some embodiments, the processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In still further embodiments, the input device is a combination of devices such as those disclosed herein.

Referring to FIG. 4, in an exemplary platform 400, an exemplary system 410 is programmed or otherwise configured to, for example, dynamically load data provider connector modules and/or request, procure, process, analyze, persist and/or provide one or more data records. In this embodiment, the system 400 includes a processor 412 (also known as a central processing unit (CPU) and "computer processor"), which can be a single core or multi core processor, or a plurality of processors for parallel processing. System 410 also includes memory or memory location (e.g., random-access memory, read-only memory, flash memory), system storage 430 (e.g., hard disk), a communication interface (e.g., network adapter) for communicating with one or more other systems, and peripheral devices, such as cache, other memory, data storage and/or electronic display adapters. The memory, system storage 430, network interface and peripheral devices are in communication with the CPU 412 through a communication bus, such as a motherboard. The system storage 430 can be a data storage unit (or data repository) for storing data. System 410 can be operatively coupled to a computer network ("network") with the aid of the communication interface. The network can be the Internet, an internet and/or extranet, or an intranet and/or extranet that is in communication with the Internet. The network in some cases is a telecommunication and/or data network. The network can include one or more computer servers, server clusters and/or distributed computing resources, providing, for example cloud computing. The network, in some cases with the aid of the system 410, can implement a peer-to-peer network, which may enable devices coupled to the device 501 to behave as a client or a server.

In some embodiments, the CPU 412 can execute a sequence of machine-readable instructions, which can be embodied in a program or software. The instructions may be stored in a memory location, such as the memory. The instructions can be directed to the CPU 412, which can subsequently program or otherwise configure the CPU 412 to implement methods of the present disclosure. The CPU 412 can be part of a circuit, such as an integrated circuit. One or more other components of the system 410 can be included in the circuit. In some cases, the circuit is an application specific integrated circuit (ASIC) or a field programmable gate array (FPGA).

In some embodiments, the system storage 430 can store files such as drivers, libraries and saved programs. The system storage 430 can store user data, e.g., user preferences and user programs. The system 410 in some cases can include one or more additional data storage units that are external, such as located on a remote server, remote server cluster, network attached storage, or the like, that is in communication through an intranet or the Internet. In some embodiments, methods as described herein can be implemented by way of machine (e.g., computer processor) executable code stored on an electronic storage location of the system 410, such as, for example, on the memory or system storage 430. The machine executable or machine readable code can be provided in the form of software. During use, the code can be executed by the CPU 412. In some cases, the code can be retrieved from the system storage 430 and stored on the memory for ready access by the CPU 412. In some situations, the system storage 430 can be precluded, and machine-executable instructions are stored on memory. In some embodiments, the code is pre-compiled. In some embodiments, the code is compiled during runtime. The code can be supplied in a programming language that can be selected to enable the code to execute in a precompiled or as-compiled fashion.

In some embodiments, the system 410 can include or be in communication with an electronic display 470. In some embodiments, the electronic display 470 provides a user interface or GUI.

Non-Transitory Computer Readable Storage Medium

In some embodiments, the platforms, systems, media, and methods disclosed herein include one or more non-transitory computer readable storage media encoded with a program including instructions executable by the operating system of an optionally networked processing device. In further embodiments, a computer readable storage medium is a tangible component of a processing device. In still further embodiments, a computer readable storage medium is optionally removable from a processing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the processing device's CPU, written to perform one or more specified tasks. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages. The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof Web Application In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language OiML). In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of nonlimiting examples, Adobe® Flash®, HTML 5, Apple® QuickTime®, Microsoft® Silverlight®, Java™, and Unity®.

Mobile Application

In some embodiments, a computer program includes a mobile application provided to a mobile processing device. In some embodiments, the mobile application is provided to a mobile processing device at the time it is manufactured. In other embodiments, the mobile application is provided to a mobile processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB .NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, Mobi-Flex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome Web Store, BlackBerry® App World, App Store for Palm devices, App Catalog for webOS, Windows® Marketplace for Mobile, Ovi Store for Nokia® devices, Samsung® Apps, and Nintendo® DSi Shop.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of nonlimiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of data, such as digital media collectibles described herein. In various embodiments, suitable databases include, by way of non-limiting examples, relational databases, nonrelational databases, object oriented databases, object databases, entity-relationship model databases, associative databases, and XML databases. In some embodiments, a database is web-based. In still further embodiments, a database is cloud computing-based. In other embodiments, a database is based on one or more local computer storage devices.

Various methods have been described herein to generate, maintain, and display 3D digital collectibles, including methods using exemplary steps. It may be understood that more or less steps may be included, and that the illustrated steps are merely non-limiting examples. Nor is the order in which the steps are presented/described indicative of any set or requisite order that must be followed. It should be appreciated that various prompts, cues, buttons, and/or other graphical/visual interactive elements may be presented to the user together with one or more of these steps. Steps depicted herein may correspond to instructions stored in computer readable storage medium which can be executed by one or more processors of computing components described herein, for example as part of computing components disclosed herein While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

The invention claimed is:

1. A computer system for generating and displaying a 3D virtual display element on a graphical user interface, the 3D virtual display element including n-surfaces, where n is a number greater than 3, and representing a digital collectible comprising content including at least one digital media file and data relating to the digital media file based on predetermined configuration information, comprising:
   at least one processor;
   a computer-readable storage medium having instructions stored thereon which are executable by the at least one processor and which, when executed, cause the computer system to:
   create a data structure in the computer-readable storage medium comprising a unique event identifier for an event, a first digital media file of the event, wherein the first digital media file comprises a video file, first data describing the event, and second data describing the event, wherein the first and second data are different;
   configure the 3D virtual display element to assign at least a representation of the first digital media file to a first surface of the n-surfaces, assign the first data to a second surface of the n-surfaces, and assign the second data to a third surface of the n-surfaces;
   generate and display the 3D virtual display element on a graphical user interface, including a display of a representation of the first digital media file when a representation of the first surface of the 3D virtual display element is forward facing; a display of the first data when a representation of the second surface of the 3D virtual display element is forward facing, and a display of the second data when a representation of the third surface of the 3D virtual display element is forward facing; and
   activate a media player to play the video file in the media player at a location outside the first surface when the first surface of the 3D virtual display element is forward facing.

2. The system of claim 1, wherein the video file comprises at least two video clips and the media player sequentially plays the video clips when the first surface of the 3D virtual display element is forward facing.

3. The system of claim 1, wherein the video file comprises a play from a sporting event, the first data comprises event data describing the play, and the second data comprises context data relating to the play.

4. The system of claim 1, wherein the video file comprises a play from a sporting event, and at least two video clips of the play from different perspectives, and the media player sequentially plays the at least two video clips when the first surface of the 3D virtual display element is forward facing.

5. The system of claim 1, further comprising an administrative module to configure the 3D virtual display element relating to the event and specify related rules, files, and data, the administrative module being further configured to specify a number of instances of the digital collectible to be created, the instructions further comprising rules for classifying a scarcity level of the digital collectible based on the number of instances of the digital collectible and rules for generating a visual indicator for display in association with the 3D virtual display element to visually distinguish a digital collectible of a first scarcity level from a digital collectible of a second scarcity level.

6. The system of claim 1, wherein the 3D virtual display element comprises a dynamic 3D virtual display element, and the instructions further cause the computer system to dynamically modify a rendered view of the 3D virtual display element, including, in response to selecting the 3D virtual display element, rotating the 3D virtual display element to display the first surface, and then rotating the 3D virtual display element to display the second or third surface.

7. The system of claim 1, wherein the video file comprises a play from a sporting event, the first data comprises event data describing the play, and the second data comprises actor data relating to a player making the play.

8. A computer system for generating and displaying a 3D virtual display element on a graphical user interface, the 3D virtual display element including n-surfaces, where n is a number greater than 4, and representing a digital collectible comprising content including at least one digital media file and data relating to the digital media file based on a predetermined configuration, comprising:
   at least one processor;
   a media player;
   a computer-readable storage medium having instructions stored thereon which are executable by the at least one processor and which, when executed, cause the computer system to:
   create a data structure in the computer-readable storage medium comprising a unique event identifier for an event, a first digital media file of the event, wherein the first digital media file comprises a video file, event data describing the event, actor data describing a person in the event, and context data describing additional information about the context of the event, wherein the event, actor, and context data are each different;
   configure the 3D virtual display element to assign at least a representation of the first digital media file to a first surface of the n-surfaces, assign the event data to a second surface of the n-surfaces, assign the actor data to a third surface of the n-surfaces, and assign the context data to a fourth surface of the n-surfaces;
   generate and display the 3D virtual display element on a graphical user interface, including a display of a representation of the first digital media file when a representation of the first surface of the 3D virtual display element is forward facing; a display of the event data when a representation of the second surface of the 3D virtual display element is forward facing, a display of the actor data when a representation of the third surface of the 3D virtual display element is forward facing, and a display of the context data when a representation of the fourth surface of the 3D virtual display element is forward facing; and
   activate the media player to play the video file in the media player at a location outside the first surface when the first surface of the 3D virtual display element is forward facing.

9. The system of claim 8, wherein the video file comprises at least two video clips and the media player sequentially plays the video clips when the first surface of the 3D virtual display element is forward facing.

10. The system of claim 8, wherein the video file comprises a play from a sporting event, and at least two video clips of the play from different perspectives, and the media player sequentially plays the at least two video clips when the first surface of the 3D virtual display element is forward facing.

11. The system of claim 8, further comprising an administrative module to configure the 3D virtual display element relating to the event and specify related rules, files, and data, the administrative module being further configured to specify a number of instances of the digital collectible to be created, the instructions further comprising rules for classifying a scarcity level of the digital collectible based on the number of instances of the digital collectible and rules for generating a visual indicator for display in association with the 3D virtual display element to visually distinguish a digital collectible of a first scarcity level from a digital collectible of a second scarcity level.

12. The system of claim 8, wherein the 3D virtual display element comprises a dynamic 3D virtual display element, and the instructions further cause the computer system to dynamically modify a rendered view of the 3D virtual display element, including, in response to selecting the 3D virtual display element, rotating the 3D virtual display element to display the first surface, and then rotating the 3D virtual display element to display the second, third, or fourth surface.

13. A computer system for generating and displaying a 3D virtual display element on a graphical user interface, the 3D virtual display element including n-surfaces, where n is a number greater than 3, and representing a digital collectible comprising content including at least one digital media file and data relating to the digital media file based on a predetermined configuration, comprising:
- at least one processor;
- a computer-readable storage medium having instructions stored thereon which are executable by the at least one processor and which, when executed, cause the computer system to:
- configure a 3D virtual display element to assign at least a representation of a first digital media file to a first surface of the n-surfaces, and first data relating to the first digital media file to a second surface of the n-surfaces;
- generate and display the 3D virtual display element, including a display of a representation of the first digital media file when a representation of the first surface of the 3D virtual display element is forward facing; and a display of the first data when a representation of the second surface of the 3D virtual display element is forward facing,
- wherein the digital media file comprises a video file and the system further comprises a media player and the instructions further cause the computer system to activate the media player to play the video file in the media player at a location outside the first surface when the first surface of the 3D virtual display element is forward facing.

14. The system of claim 13, wherein the video file comprises at least two video clips and the media player sequentially plays the video clips when the first surface of the 3D virtual display element is forward facing.

15. The system of claim 13, wherein the video file comprises a play from a sporting event, and the first data comprises event data describing the play.

16. The system of claim 13, wherein the video file comprises a play from a sporting event, and at least two video clips of the play from different perspectives, and the media player sequentially plays the at least two video clips when the first surface of the 3D virtual display element is forward facing.

17. The system of claim 13, further comprising an administrative module to configure the 3D virtual display element relating to an event and specify related rules, files, and data, the administrative module being further configured to specify a number of instances of the digital collectible to be created, the instructions further comprising rules for classifying a scarcity level of the digital collectible based on the number of instances of the digital collectible and rules for generating a visual indicator for display in association with the 3D virtual display element to visually distinguish a digital collectible of a first scarcity level from a digital collectible of a second scarcity level.

18. The system of claim 13, wherein the 3D virtual display element comprises a dynamic 3D virtual display element, and the instructions further cause the computer system to dynamically modify a rendered view of the 3D virtual display element, including, in response to selecting the 3D virtual display element, rotating the 3D virtual display element to display the first surface, and then rotating the 3D virtual display element to display the second surface.

19. The system of claim 13, wherein the video file comprises a play from a sporting event and the first data comprises actor data relating to a player making the play.

20. A computer system for generating and displaying a 3D virtual display element on a graphical user interface, the 3D virtual display element including n-surfaces, where n is a number greater than 3, and representing a digital collectible comprising content including at least one digital media file and data relating to the digital media file based on a predetermined configuration, comprising:
- at least one processor;
- a media player;
- a computer-readable storage medium having instructions stored thereon which are executable by the at least one processor and which, when executed, cause the computer system to:
- configure a 3D virtual display element to assign at least a representation of a first digital media file comprising a video file to a first surface of the n-surfaces, first data relating to the first digital media file to a second surface of the n-surfaces, and second data relating to the first digital media file to a third surface of the n-surfaces, wherein the first and second data are different;
- generate and display the 3D virtual display element, including a display of a representation of the first digital media file when a representation of a first surface of the 3D virtual display element is forward facing; a display of the first data when a representation of the second surface of the 3D virtual display element is forward facing, and a display of the second data when a representation of the third surface of the 3D virtual display element is forward facing,
- wherein the 3D virtual display element comprises a dynamic 3D virtual display element, and the instructions further cause the computer system to:
- dynamically modify a rendered view of the 3D virtual display element, including, in response to selecting the 3D virtual display element, rotating the 3D virtual display element to display the first surface, and then rotating the 3D virtual display element to display the second or third surface; and activate the media player to play the video file in the media player at a location outside the first surface when the first surface of the 3D virtual display element is forward facing.

21. The system of claim 20, wherein the video file comprises at least two video clips and the media player sequentially plays the video clips when the first surface of the 3D virtual display element is forward facing.

22. The system of claim 20, wherein the video file comprises a play from a sporting event, the first data comprises event data describing the play, and the second data comprises context data relating to the play.

23. The system of claim 20, wherein the video file comprises a play from a sporting event, and at least two video clips of the play from different perspectives, and the media player sequentially plays the at least two video clips when the first surface of the 3D virtual display element is forward facing.

24. The system of claim 20, further comprising an administrative module to configure the 3D virtual display element relating to an event and specify related rules, files, and data, the administrative module being further configured to specify a number of instances of the digital collectible to be created, the instructions further comprising rules for classifying a scarcity level of the digital collectible based on the number of instances of the digital collectible and rules for generating a visual indicator for display in association with the 3D virtual display element to visually distinguish a digital collectible of a first scarcity level from a digital collectible of a second scarcity level.

25. The system of claim 20, wherein the video file comprises a play from a sporting event, the first data comprises event data describing the play, and the second data comprises actor data relating to a player making the play.

* * * * *

UNITED STATES PATENT AND TRADEMARK OFFICE
CERTIFICATE OF CORRECTION

PATENT NO. : 11,393,162 B1
APPLICATION NO. : 17/529383
DATED : July 19, 2022
INVENTOR(S) : McEroy Flavelle et al.

It is certified that error appears in the above-identified patent and that said Letters Patent is hereby corrected as shown below:

On the Title Page

In item (71), in "Applicant", in Column 1, Line 1, after "Labs", insert --,--

In the Specification

In Column 7, Line 41, delete "443." and insert --442.-- therefor

In Column 7, Line 42, delete "440" and insert --442-- therefor

In Column 8, Line 17, delete "424)" and insert --422)-- therefor

In Column 13, Line 22, after "200$f$", insert --.--

In Column 13, Line 60, delete "400," and insert --410,-- therefor

In Column 15, Line 17, delete "400" and insert --410-- therefor

In Column 16, Line 61, after "thereof", insert --.--

In Column 17, Line 19, delete "OiML)." and insert --(XML).-- therefor

Signed and Sealed this
Sixth Day of June, 2023

Katherine Kelly Vidal
*Director of the United States Patent and Trademark Office*